(12) United States Patent
Mutalik et al.

(10) Patent No.: US 9,065,964 B1
(45) Date of Patent: Jun. 23, 2015

(54) REDUCING FOUR WAVE MIXING INGRESS

(75) Inventors: Venkatesh G. Mutalik, Middleton, CT (US); Marcel F. Schemmann, Maria Hoop (NL); Shamsuddin H. Chasmawala, Middleton, CT (US); Joseph F. Chiappetta, Shelton, CT (US)

(73) Assignee: ARRIS Enterprises, Inc., Suwanee, GA (US)

( * ) Notice: Subject to any disclaimer, the term of this patent is extended or adjusted under 35 U.S.C. 154(b) by 686 days.

(21) Appl. No.: 12/857,929

(22) Filed: Aug. 17, 2010

Related U.S. Application Data

(60) Provisional application No. 61/234,612, filed on Aug. 17, 2009.

(51) Int. Cl.
  H04N 7/173 (2011.01)
  H04N 7/10 (2006.01)
  H04N 21/61 (2011.01)

(52) U.S. Cl.
  CPC .............. *H04N 7/102* (2013.01); *H04N 21/61* (2013.01)

(58) Field of Classification Search
  CPC .............. H04N 7/102; H04N 7/17309; H04N 7/17318; H04N 21/235
  USPC ............. 725/87–125, 143–150; 709/217–232
  See application file for complete search history.

(56) References Cited

U.S. PATENT DOCUMENTS

| | | | |
|---|---|---|---|
| 4,245,245 A * | 1/1981 | Matsumoto et al. .......... | 380/211 |
| 5,546,210 A | 8/1996 | Chraplyvy et al. | |
| 5,617,239 A * | 4/1997 | Walker .......................... | 398/116 |
| 5,939,887 A * | 8/1999 | Schmidt et al. ............... | 324/628 |
| 6,339,487 B1 * | 1/2002 | Gnauck et al. ................. | 398/42 |
| 6,417,942 B1 * | 7/2002 | Seto et al. ......................... | 398/5 |
| 6,735,398 B1 * | 5/2004 | Izadpanah et al. ............ | 398/189 |
| 6,741,629 B1 * | 5/2004 | Garnache et al. .............. | 372/96 |
| 6,791,995 B1 * | 9/2004 | Azenkot et al. ............... | 370/436 |
| 6,798,994 B1 * | 9/2004 | Tsao et al. ..................... | 398/204 |
| 7,215,836 B2 * | 5/2007 | Vakhshoori et al. ............. | 385/4 |
| 7,526,211 B2 * | 4/2009 | Mcnicol et al. ............... | 398/204 |
| 7,773,883 B1 * | 8/2010 | Weng et al. ..................... | 398/83 |
| 8,019,221 B2 * | 9/2011 | Zancewicz ..................... | 398/72 |
| 8,340,523 B2 * | 12/2012 | Shen et al. ....................... | 398/85 |
| 2004/0247320 A1 * | 12/2004 | Bickham et al. ............... | 398/71 |
| 2005/0265647 A1 * | 12/2005 | Vakhshoori et al. ............. | 385/4 |
| 2007/0297801 A1 * | 12/2007 | Mostert et al. ................. | 398/81 |
| 2010/0183294 A1 * | 7/2010 | Villarruel et al. .............. | 398/10 |

OTHER PUBLICATIONS

F. Forghieri, "WDM systems with unequally spaced channels", IEEE Journal of Lightwave Technology, vol. 13, Issue 5, May 1995, Abstract.

B. Hwang, "A generalized suboptimum unequally spaced channel allocation technique. i. In IM/DD WDM systems", IEEE Transactions on Communications, vol. 46, Issue 8, Aug. 1998, Abstract.

* cited by examiner

*Primary Examiner* — Annan Shang

(74) *Attorney, Agent, or Firm* — Troy A. Van Aacken

(57) ABSTRACT

A multi-wavelength CATV transmission system includes transmitters adapted to emit carrier wavelengths on a 12.5 GHz+/−20% ITU grid with a minimum spacing between carriers and/or carriers and their beat product groups of 37.5 GHz+/−20%.

19 Claims, 9 Drawing Sheets

| Carrier | ITU Wavelength in THz | Wavelength in nm | SRS dB | XPM dB | SRS CSO | 4WM dB | Mitigated 4WM dB |
|---|---|---|---|---|---|---|---|
| 1 | 193.3000 | 1550.92 | 42.0 | 56.1 | 70.0 | 57.0 | 67.0 |
| 2 | 193.6375 | 1548.21 | 42.9 | 55.4 | 70.9 | 56.0 | 66.0 |
| 3 | 192.7750 | 1555.14 | 40.3 | 53.2 | 68.3 | 55.6 | 65.6 |
| 4 | 193.9375 | 1545.82 | 43.4 | 53.8 | 71.4 | 55.1 | 65.1 |
| 5 | 192.5875 | 1556.66 | 39.6 | 55.6 | 67.6 | 60.0 | 70.0 |
| 6 | 192.3625 | 1558.48 | 38.9 | 55.0 | 66.9 | 57.4 | 67.4 |
| 7 | 194.3875 | 1542.24 | 43.4 | 55.1 | 71.4 | 55.7 | 65.7 |
| 8 | 192.1000 | 1560.61 | 38.1 | 54.5 | 66.1 | 58.0 | 68.0 |
| 9 | 194.7625 | 1539.27 | 42.7 | 53.8 | 70.7 | 55.3 | 65.3 |
| 10 | 195.3625 | 1534.54 | 40.8 | 53.3 | 68.8 | 55.7 | 65.7 |
| 11 | 196.1500 | 1528.38 | 38.2 | 53.4 | 66.2 | 57.0 | 67.0 |
| 12 | 196.2625 | 1527.51 | 37.9 | 54.6 | 65.9 | 58.6 | 68.6 |
| 13 | 192.2125 | 1559.69 | 38.4 | 53.3 | 66.4 | 56.9 | 66.9 |
| 14 | 195.1750 | 1536.02 | 41.4 | 54.5 | 69.4 | 55.8 | 65.8 |
| 15 | 195.7000 | 1531.90 | 39.7 | 57.1 | 67.7 | 60.8 | 70.8 |
| 16 | 196.0000 | 1529.55 | 38.7 | 55.7 | 66.7 | 58.4 | 68.4 |
| 17 | 192.8875 | 1554.23 | 40.6 | 52.8 | 68.6 | 54.7 | 64.7 |
| 18 | 193.0375 | 1553.03 | 41.1 | 55.0 | 69.1 | 55.1 | 65.1 |
| 19 | 193.4875 | 1549.42 | 42.5 | 54.8 | 70.5 | 55.4 | 65.4 |
| 20 | 194.0500 | 1544.92 | 43.5 | 53.4 | 71.5 | 54.9 | 64.9 |
| 21 | 194.2375 | 1543.43 | 43.5 | 54.5 | 71.5 | 55.2 | 65.2 |
| 22 | 194.6500 | 1540.16 | 42.9 | 53.8 | 70.9 | 55.1 | 65.1 |
| 23 | 195.0250 | 1537.20 | 41.9 | 55.1 | 69.9 | 56.4 | 66.4 |
| 24 | 195.4750 | 1533.66 | 40.4 | 53.7 | 68.4 | 56.2 | 66.2 |

Legend
SRS dB: SRS crosstalk, in dB
XPM dB: Cross phase modulation, in dB
SRS CSO: CSO induced by the SRS, in dB
4WM dB: Amount of optical 4WM power below each carrier, in dB
Mitigated 4WM dB: Amount of effective 4WM power below each carrier after mitigation techniques have been applied, in dB.

FIG. 8 f1, f2, f3 type of beat (non-degenerate)

| frequency | relative beat level |
|---|---|
| 0 | 1.26 |
| 380 GHz | 0.79 |
| 570 GHz | 0.24 |
| 760 GHz | 0.07 | f1,f1,f2 type of beat (degenerate)

| Frequency | relative beat level |
|---|---|
| 0 | 0.31 |
| 380 GHz | 0.20 |
| 570 GHz | 0.07 |
| 760 GHz | 0.02 |

FIG. 9

REDUCING FOUR WAVE MIXING INGRESS

TECHNICAL FIELD

This disclosure relates to reducing ingress from four wave mixing.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

In addition to providing services through the MSO over a hybrid fiber-cable (HFC) network, services can also be provided through a radio frequency over glass (RFoG) network, which generally includes a topology that can allow for an MSO to provide for a fiber architecture from the headend to a field node at a user's location (the field node can also be referred to as an optical network unit (ONU)). With an RFoG network, the "Coaxial" in HFC might only be within the subscriber's residence. However, more than one ONU in an RFoG network transmitting upstream at any one time can cause a condition which can be referred to as optical beat interference (OBI). One source of OBI can be an optical non-linear impairment referred to as four wave mixing ingress (4WM).

BRIEF DESCRIPTION OF THE DRAWINGS

FIG. 8 is an illustration of example carrier wavelengths in a CATV optical communication system, 5.2 dB/meter carrier launch power.

FIG. 9 is an illustration of two charts showing frequency and relative beat level In the drawings, like reference numbers and designations in the various drawings indicate like elements. The same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

In some implementations of this disclosure, systems and methods can operate to schedule the transmission of data from various user devices, such as cable modems, using optical networks.

Figure 1:
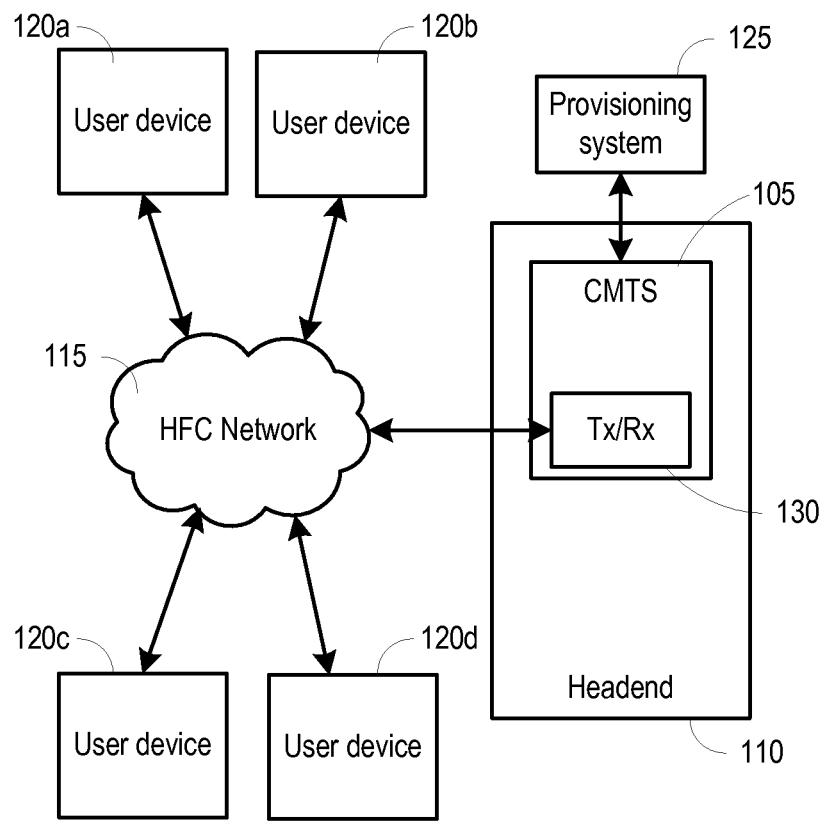
FIG. 1 is a block diagram illustrating an example network environment showing an HFC network coupled to a headend.

FIG. 1 is a block diagram illustrating an example network environment 100 that can include a cable modem termination system (CMTS) 105 located at a headend 110 of a multiple service operator (MSO), such as a cable company. FIG. 1 can also include a network, such as a Hybrid Fiber-Coaxial ("HFC") network 115, through which one or more user devices 120a-d (e.g., which can include cable modems, EMTAs (also known as cable telephony modems), or set-top boxes) can communicate with the CMTS 105. It should be understood that only four user devices 120a-d are shown (for illustrative purposes), but more can be deployed. FIG. 1 can also include a provisioning system 125 operable of communicating with one or more CMTSs.

In some implementations, a headend 110 can provide video, data and voice service to a subscriber. The CMTS 105 can include a processor, a memory, and a storage device. It can also have one or more transmitters/receivers 130 for transmitting signals through one or more networks, including the HFC network 115, to one or more user devices 120a-d. The transmitters/receivers 130 can be one or more separate transmitter and receiver components residing on the same board, or separate boards; further, the transmitter and receiver can also include various sub-components, such as modulators and demodulators. The CMTS 105 can also receive data signals from user devices, such as cable modems 120a-d, EMTAs, and/or set top boxes, through one or more networks, including the HFC network 115.

The example HFC network 115 can use a combination of optical fibers and coaxial cable to send data to and receive data from the headend 110. The HFC network 115 can be bi-directional, wherein signals are carried in both directions on the same network from the headend 110 to the user devices 120a-d, and from the user devices 120a-d to the headend 110. The downstream signals, which can also be referred to as forward-path signals, carry information from the headend 110 to the home such as video content, voice, and internet data. The upstream signals, which can also be referred to as return-path signals, carry information from user devices to the headend 110, such as control signals to order a movie, or internet data such as email.

The optical fiber portion of an HFC network 115 can extend from the headend 110 (e.g., including centralized, local or regional headends) to one or more neighborhoods' hubsite, and then to a fiber optic node. The co-axial portion of an HFC network 115 uses co-axial cable connecting the fiber optic node to a plurality of homes having end user devices 120a-d. In example implementations, the HFC transmitter/receiver 130 can transmit communications directly to an HFC network (e.g., HFC network 115 of FIG. 1). In other implementations, the HFC/modulation interface 340 can transmit communications to a modulator (e.g., an EQAM, combiner, mixer, etc.) for generation of an RF signal for transmission on an HFC network. The various signals from the headend 110 can be encoded, modulated, and/or upconverted onto RF carriers, combined onto an electrical signal, and inserted into a broadband optical transmitter. The broadband optical transmitter can be operable to convert the electrical signal to a downstream optically modulated signal that is sent to one or more fiber optic nodes. An example fiber optic node has a broadband optical receiver which converts the downstream optically modulated signal into an electrical signal operable to propagate through co-axial cables to end user devices 120*a-d*. The downstream electrical signal can be a radio frequency (RF) modulated signal. The forward-path and the return-path can be carried over the same coaxial cable in both directions between the optical node and the end user devices. To prevent interference of signals, the frequency band can be divided into two sections in which one frequency band carries forward-path signals, and another carries return-path signals. For the return path, one of the user devices 120*a-d* transmits on any given frequency at any given time. However, it should be noted that multiple user devices 120*a-d* can transmit at different frequencies simultaneously. Typically, requests for upstream bandwidth are made by the user devices 120*a-d*. The CMTS 105 can grant or deny such requests. In some implementations, the CMTS 105 can generate one or more transmission maps that allocate user devices 120*a-d* a specific time slot and frequency at which the user devices 120*a-d* can transmit. The transmission maps can be generated using, for example, DOCSIS 3.0's enhanced concatenation and fragmentation algorithm, or any other suitable algorithm.

FIG. 1 also shows a provisioning system 125. The provisioning system can be operable to communicate with one or more CMTSs. Among other functions, a provisioning system 125 can include software that can be used to get user devices 120*a-*d ready to exchange data, including activating the CMTS to dynamically assign IP addresses to user devices 120*a-d*.

Figure 2:
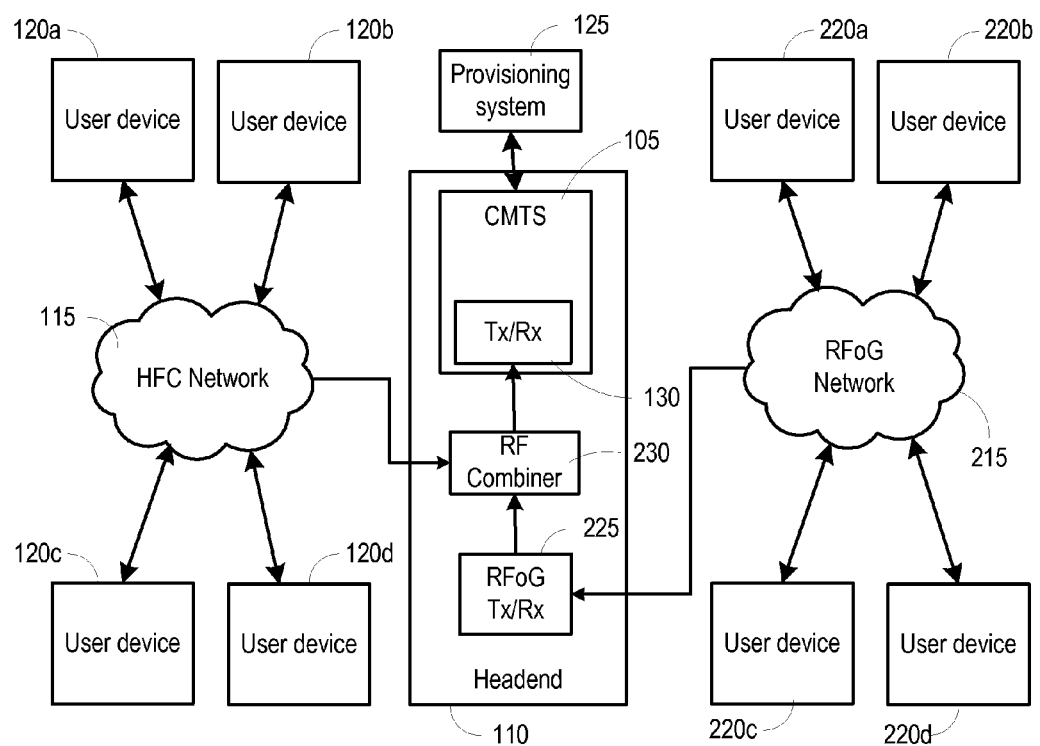
FIG. 2 is a block diagram illustrating an example network environment showing a both an RFoG network and a HFC network, both coupled to a headend.

FIG. 2 is an illustration of an example radio frequency over glass (RFoG) network 215 that can be deployed with an existing HFC network 115. An RFoG topology includes an all-fiber service from the headend 110 to a field node, or optical network unit (ONU) (see FIG. 3), which is typically located at or near the user's premises. Coaxial cable can be used to connect the ONUs of an RFoG network to one or more user device 220*a-d*, wherein the RFoG user devices 220*a-d* can include cable modems, EMTAs, or set-top boxes, as with the user devices of an HFC network. In the headend, a downstream laser sends a broadcast signal that is optically split a multitude of times. The optical network unit, or ONU, recovers the RF broadcast signal and passes it into the subscriber's coax network.

Upstream transmissions from the user devices 220*a-d* can pass through the RFoG network 215 and be received by an RFoG transmitter/receiver 225 at the headend. In various implementations, the RFoG transmitter/receiver 225 can be one or more separate transmitter and receiver components residing on the same board, or alternatively separate boards; further, the transmitter and receiver can also include various sub-components, such as modulators and demodulators. The RFoG transmitter/receiver 225 receives the optically modulated signals on optical channels and demodulates the signals into the electrical signals, which can be RF signals. Signals from the RFoG network 215 can then be combined with one or more RF signals coming from other HFC networks such as HFC network 115, or from other RFoG networks using an RF Combiner 230, before being received by the CMTS transmitter/receiver 130. The connections illustrated between the RFoG network 215 and the HFC network 115 and the CMTS transmitter/receiver reflect an upstream transmission only.

Figure 3:
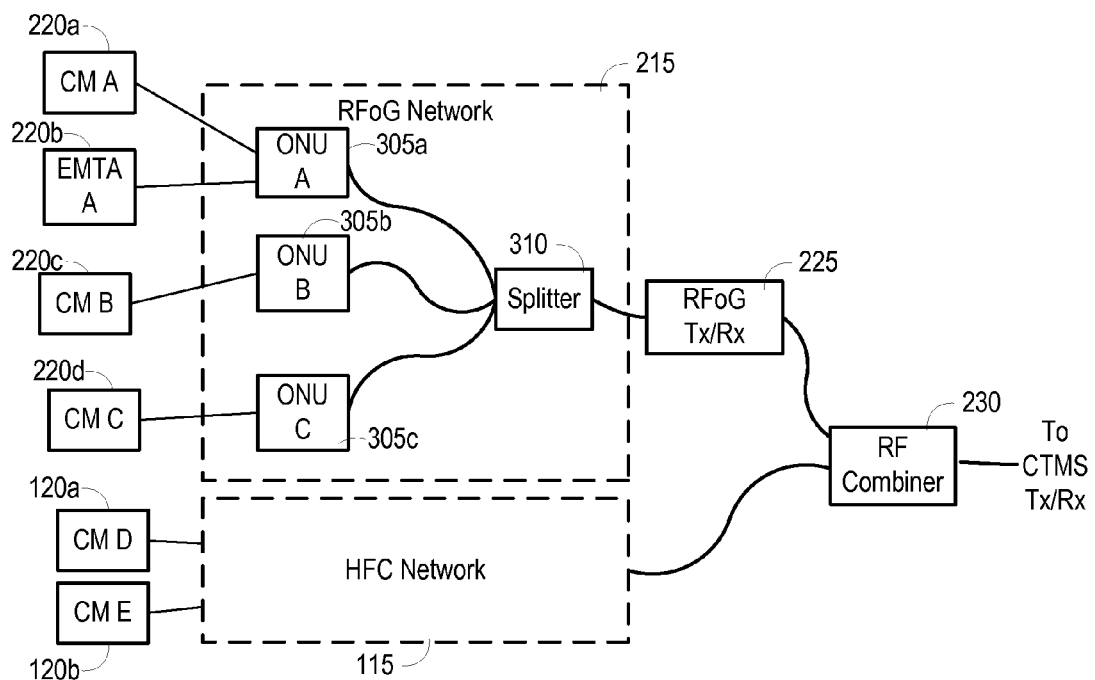
FIG. 3 is a block diagram illustrating example components of an RFoG network.

FIG. 3 illustrates components that might be part of the example RFoG network 215. User devices 220*a-d* can be connected to an RFoG network 215, wherein the RFoG network 215 can include one or more ONUs 305*a-c* connected to an optical splitter 310. In the example shown, user device 220*a* can be a cable modem A (CM A), user device 220*b* can be an EMTA (EMTA A), wherein both CM A 220*a* and EMTA A 220*b* are connected to the same ONU (e.g., ONU A 305*a*). In this example, user device 220*c* can be a cable modem (CM B) and connected to ONU B 305*b*, and user device 220*d* can be a cable modem (CM C) connected to ONU C 305*c*.

The user devices 220*a-d* can transmit RF signals to their respective ONUs 305*a-c*. The ONU 305*a-c* can modulates the upstream RF traffic onto optical channels and sends those signals to the optical splitter, which then passes on the signals on the optical channels to the RFoG transmitter/receiver 225, which can be located at the headend 110. As mentioned above, the RFoG transmitter/receiver 225 recovers the RF signals from the optical channels via demodulation. The RF signals can then be sent to an RF combiner 230, where the RF signals can be combined with other RF signals from other RFoG or HFC networks. One consideration in the upstream, however, is that more than one ONU transmitting at a time can cause interferometric beat noise, a condition which can be referred to as optical beat interference (OBI). This condition can result in both transmissions being lost.

Figure 4:
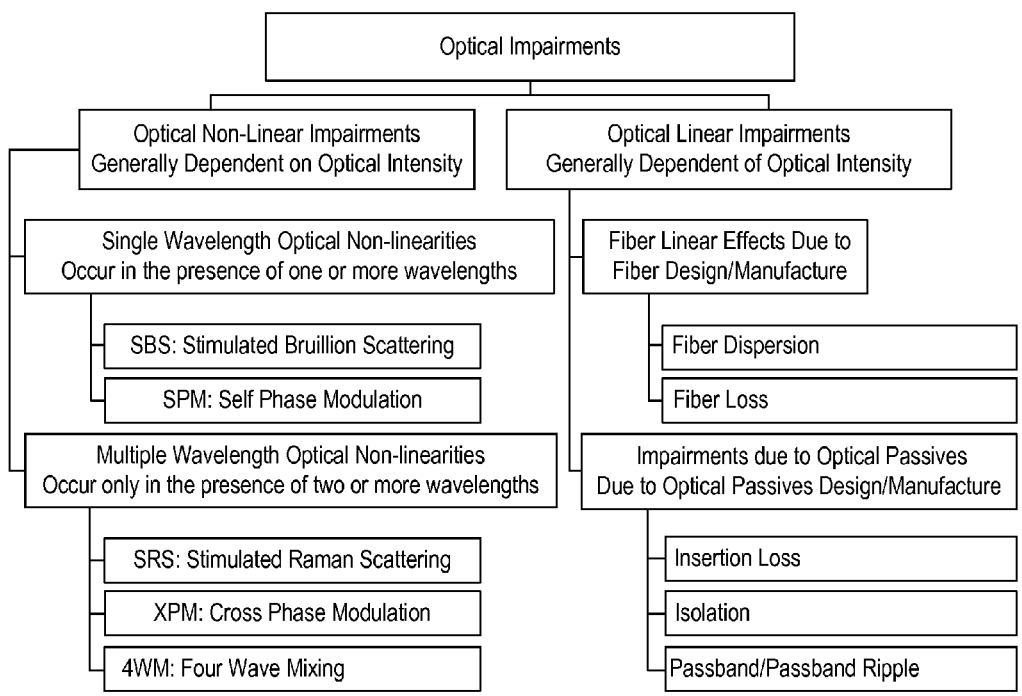
FIG. 4 is a taxonomical illustration of optical effects and optical non-linearities that can be present in multi-wavelength optical communication systems.
Figure 5:
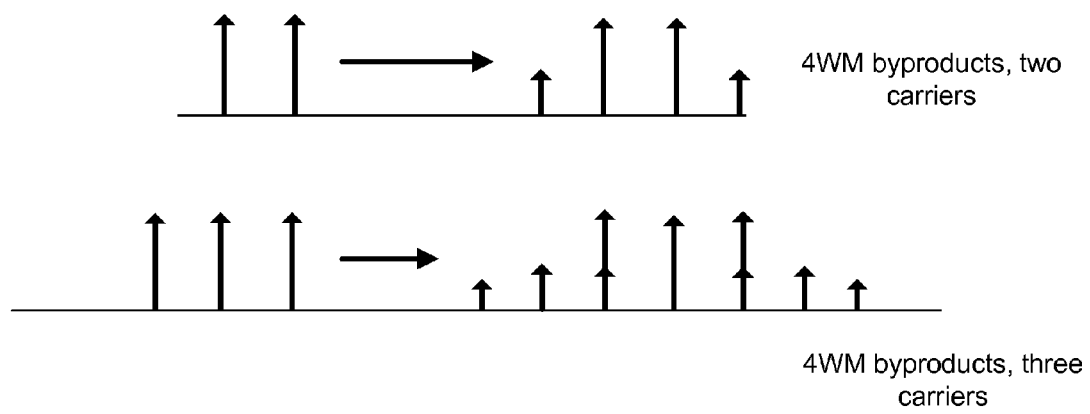
FIG. 5 is an illustration of an example in which two carrier signals and three carriers produce 4WM by-products (beats).

Communication in multi-wavelength systems is a delicate balance of identifying and managing optical effects and optical non-linearities. A taxonomy of these effects is presented in FIG. 4.

One source of OBI can be an optical non-linear impairment referred to as four wave mixing ingress (4WM). 4WM can result when two or three optical wavelengths interact to generate additional optical wavelengths at sum or difference wavelengths. If these then fall under other carriers, significant carrier-to-noise ratio (CNR) degradation can occur. FIG. 2 is an illustration of an embodiment of two carrier signals producing 4WM byproducts (beats) and three carrier signals producing 4WM byproducts. This 4WM phenomena, also called 4WM ingress, can limit the distance, quality, and signal density of multi-wavelength systems, especially full spectrum multi-wavelength systems, where high power transmission is often the norm.

Figure 6:
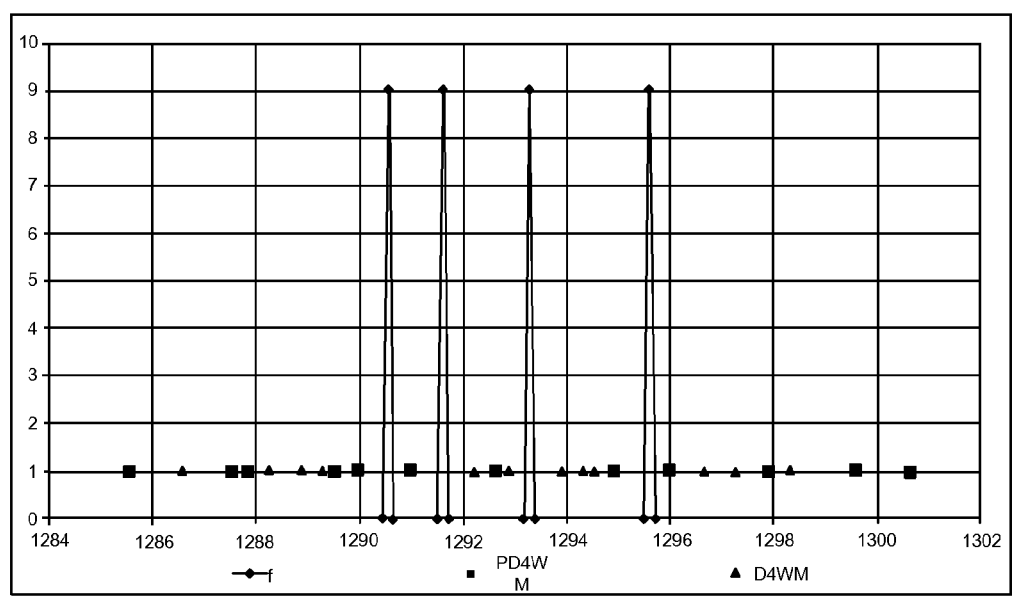
FIG. 6 is an illustration of an example implementation of non-uniformly spaced carrier signals that do not align with any 4WM byproducts.
Figure 7:
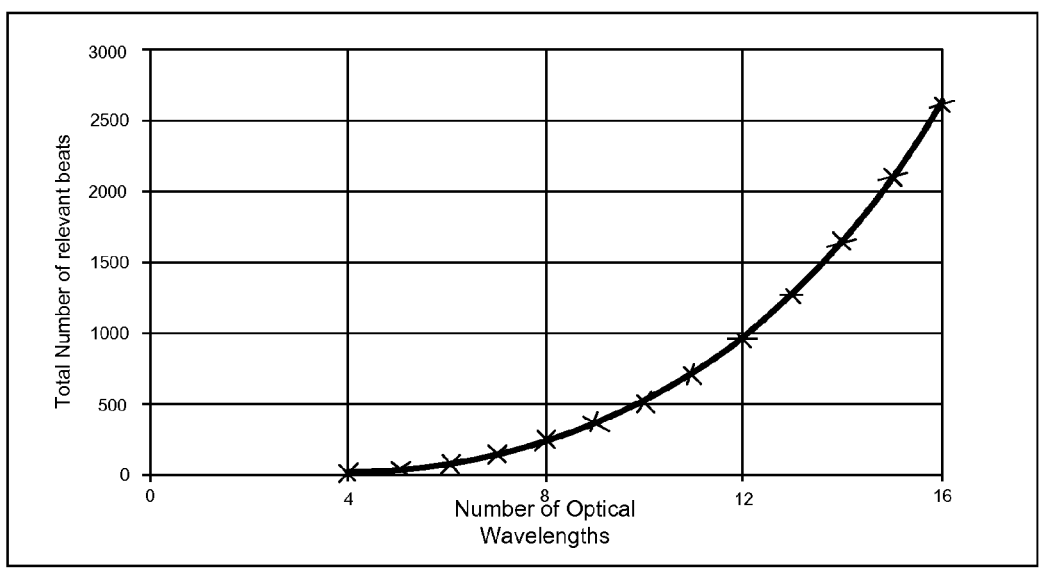
FIG. 7 is an illustration of an example of 4WM beat number varying with carrier number.

In some example implementations, one method to reduce or eliminate 4WM ingress is to set the carrier wavelengths so that none of the beats fall on any of the carriers. This can be accomplished by setting non-uniformly spaced optical wavelengths for the carriers. As shown in FIG. 6, the carrier wavelengths can be selected such that the beats do not fall on the carriers even with system variations over time and over temperature. The number of beats scales with the third power of the number of carriers Sometimes, especially with a higher number of optical carriers, it becomes necessary that some beats be accepted under the carriers. When that happens, care must be taken that only weak 4WM beats fall under any carrier. FIG. 7 shows that the beats proliferate with the number of carriers.

Stimulated Brillouin Scattering Suppression Carriers

For intense beams (e.g. laser light) travelling in a medium such as an optical fiber, the variations in the electric field of the beam itself might produce acoustic vibrations in the medium via electrostriction. The beam might undergo Brillouin scattering from these vibrations, usually in a direction opposite to the incoming beam, a phenomenon known as stimulated Brillouin scattering (SBS).

The impact of 4WM in optical communication systems might be acceptable so long as the cumulative beat power is kept at or below −70 dB relative to the carriers. In externally modulated systems (where the light is modulated after leaving the laser), the effect of 4WM is complicated by the presence of SBS suppression carriers. To mitigate the effects of SBS, the power of a particular carrier can be spread out across multiple, closely spaced carriers.

There can typically be 5-7 individual carriers over which the transmitter power is spread more or less evenly. SBS suppression carriers are typically spread in multiples of about 2 GHz spread around the optical carrier. Thus in the case of five SBS carriers these are at −4, −2, 0, 2 and 4 GHz relative to the central optical carrier (0 GHz). For seven carriers the frequency range covered further increases to −6 to 6 GHz relative to the central optical carrier.

The total spectral width of a group of SBS suppression carriers is referred to herein as the "transmitter spectral width".

Each carrier of an SBS suppression group is an individual carrier wavelength that interacts with others to generate 4WM products. 4WM products result from the interaction of two or three SBS suppression carriers, and the resulting 4WM products might be spectrally spread in a range of up to three times the transmitter spectral width. For 5-7 SBS suppression carriers in a group, that results in groups of 4WM beats, inter-spaced at about 2 GHz, in a range of +/−12 GHz to +/−18 GHz.

When any SBS beat of a carrier overlaps with a 4WM beat product, the two optical wavelengths interfere and create a signal at a detector. Any such 4WM beat product involves multiple laser sources that are mutually not correlated, therefore the 4WM beat might have an optical phase that is not correlated to the SBS beat that it is overlapping with. This might result in a random detector signal. The detector will then put out a noise signal that is typically superimposed upon the desired signals being transmitted by the optical link. The random signal component can lead to a degradation of the signal to noise ratio of the desired signal provided by the detector. The transmitter spectral width is typically around 8-12 GHz so that given the wide range over which the 4WM beats are scattered (+/−12 to +/−18 GHz) there is ample opportunity for an overlap.

Characteristics of SBS Beats in CATV Systems

In cable television (CATV) optical communication systems, the random signal at the detector resulting from 4WM of SBS carrier beats has certain spectral properties. These arise from characteristics of the lasers used in CATV optical transmission systems with external modulation. The spectral width of these lasers is small, typically under 1 MHz. When the spectrum of such a laser is split into individual SBS peaks, the spectral width of these individual peaks remains small. These SBS peaks interact with SBS peaks of other lasers to generate the 4WM beats.

The spectral width of individual beats resulting from the interaction of three carriers is typically about sqrt(3) times larger than the spectral width of the individual carriers, e.g. around sqrt(3)*1 MHz. When a 4WM beat overlaps with a carrier, the resulting noise term has a spectral width that is about sqrt(4)=2 times larger (<2 MHz) than the carrier spectral width. The line-width of the laser is narrow, but the modulator adds some modulated spectrum to it such that a part of this line-width is converted to a broad spectrum. However most of the laser power remains within the narrow laser line-width.

The central frequency of the noise term is given by the difference in optical frequency of 4WM beat and carrier peaks. In CATV systems, whenever that difference is less than 1 GHz, this noise term is within the signal band. A 2 GHz spacing of 4WM beats and carrier peaks means that whenever there is overlap of the SBS carrier suppression group and 4WM beat group, there are always combinations with differences under 1 GHz, meaning noise in the signal band. Typically the SBS suppression carrier spacing is set to the same frequency on all transmitters with an accurate crystal oscillator. This results in the same frequency spacing for all 4WM beats, with the result that all participating SBS suppression carriers and 4WM beats generate noise at the same central frequency.

In a CATV system the signal band is divided into channels that are typically 6 MHz spaced and contain information in a band 4-5 MHz wide. Given the narrow width of the noise spectrum, all the noise power can fall within a single channel, leading to a major degradation of that individual channel signal to noise ratio.

Wavelength Plans

In example implementations, techniques are proposed herein for transmitting information in CATV systems on multiple carrier wavelengths, where SBS suppression carriers are used to spread the transmission power. Techniques are described for transmission of four, eight, twelve, sixteen, twenty-four, and thirty-two carrier wavelengths, each one spread into multiple SBS suppression carriers.

FIG. 8 depicts a table shows an example implementation of carrier wavelengths in a CATV Optical Communication System having 5.2 dB-milliwatt carrier launch power.

The following plans assume a CATV transmission load of 77 analog signals plus a digital load to 1 Ghz, with 49 dB carrier-to-noise ratio (CNR) at the receiver. Transmission distances can be extended beyond 20 km if the number of analog channels is reduced to 20. Implementation variations will of course occur, so these plans provide guidelines but not absolute values or limits.

Four Carriers

An example four carrier plan can be provided by wavelengths 1-4 of the table shown in FIG. 8. The carriers have non-uniform spacing and can be aligned on 12.5 GHz ITU grid points with a minimum of 37.5 GHz spacing between carriers. Consequently no 4WM products overlap with carriers. The transmission distance can be up to 65 km.

Eight Carriers

An example eight carrier plan can be provided by wavelengths 1-8 of the table shown in FIG. 8. The carriers have non-uniform spacing and can be aligned on 12.5 GHz ITU grid points with a minimum of 37.5 GHz spacing ("37.5 GHz Spacing", see below). Consequently no 4WM products overlap with carriers. The transmission distance can be up to 45 km.

Twelve Carriers

An example twelve carrier plan can be provided by wavelengths 1-12 of the table shown in FIG. 8. The carriers have non-uniform spacing and can be aligned on 12.5 GHz ITU grid points with a minimum of 37.5 GHz spacing. Consequently no 4WM products overlap with carriers.

Sixteen Carriers

An example sixteen carrier plan can be provided by wavelengths 1-16 of the table shown in FIG. 8. The carriers have non-uniform spacing and can be aligned on 12.5 GHz ITU grid points with a minimum of 37.5 GHz spacing. Some 4WM mixing products overlap with carriers. However, the 4WM products have a worst-case cumulative optical power that is −66 dB relative to carrier power at transmission distances up to 30 km. This worst case may be mitigated to an effective −76 dB using techniques described below.

Twenty-Four Carriers

An example twenty-four carrier plan can be provided by wavelengths 1-24 of the table shown in FIG. 8. The carriers have non-uniform spacing and can be aligned on 12.5 GHz ITU grid points with a minimum of 37.5 GHz spacing. Some 4WM mixing products overlap with carriers. However, the 4WM products have a worst-case cumulative optical power that is −56 dB relative to carrier power at transmission distances up to 20 km. This worst case may be mitigated to an effective −66 dB using techniques described below.

Thirty-Two Carriers

Those skilled in the art may apply the teachings herein to design a thirty-two carrier plan with acceptable 4WM noise components.

37.5 MHz Spacing

As described above, zero or low-impact 4WM plans can be designed with the spacing between transmitter central wavelengths and 4WM beat groups being multiples of 37.5 GHz. To accommodate more optical channels in a given bandwidth, overlap of transmitter wavelengths and 4WM beat groups can be allowed. In particular, overlap may be allowed when the 4WM beat groups are weak (low power). The strength of a 4WM beat (group) is dependent on a multitude of factors such as transmitted power, fiber length, fiber type, and the optical frequencies of the transmitters involved in generating the 4WM beat. The 4WM beat frequency is fb=f1+f2−f3 where f1, f2 and f3 are the optical frequencies of the participating transmitters (carriers). For a non-degenerate beat, a walk-off parameter (f1−3)*(f2−6) can be defined. Similarly, for degenerate beats with frequency fb=f1+f1−3, a walk-off parameter can be defined as (f1−f3)². For a large walk-off parameter, the beat is weak. A wavelength plan can be designed that allows overlap of transmitter wavelengths (carriers) and weak beat groups, resulting in an acceptably low CNR impact and robust performance.

Beat Group Spacing

FIG. 9 depicts two charts showing frequency and relative beat level. The walkoff parameter is expressed in units of frequency squared. For the frequency values in FIG. 9, walkoff=frequency², relative beat level=beat power level to be expected for indicated spacing.

In practical systems a minimum walkoff of 600 GHz for degenerate and 800 GHz for non-degenerate beats may be used. Multiple beats may fall into a single channel, thus the sum power of these beats must also be considered.

4WM Mitigation Techniques

The following description covers some example implementations of techniques for mitigating the effects of 4WM in multi-wavelength optical systems, especially those employing SBS suppression carriers.

Limit SBS Spreading of the Transmitter Output

Each signal carrier has a peak in the optical spectrum. SBS carrier suppression (e.g. via light chopping) splits that signal carrier into multiple peaks at a regular spacing. This spacing is typically around 2 GHz. The modulation frequency that is used to chop the signal, for instance ~2 GHz, determines this spacing. The modulation signal shape and amplitude determine into how many peaks the carrier spectrum is split. For instance, the carrier spectrum can be split into five peaks (with associated bands), each one comprising around ⅕th of the total carrier power. The carrier spectrum can be split into three peaks, each ⅓rd of the total carrier power, and so on. The individual peak power level determines the launch power of the carrier at the transmitter. This individual peak power level is roughly constant at the SBS limit; on the order of 6 dBm (4 mW). In the case where the carrier power is divided over three peaks, three times the 4 mW power may be launched for that carrier (12 mW or 11 dBm). In case the carrier is split over five peaks, five times 4 mW (20 mW or 13 dBm) total power can be launched for the carrier. The more the spectrum is split into peaks, the more total power may be launched. However, because the peak spacing is a constant (around 2 GHz), the transmitter spectral width also gets wider when it is split into more peaks. In a practical case, around five peaks are used.

Splitting the carrier into fewer peaks reduces the overlap opportunities between carriers and 4WM byproducts. The number of 4WM beats is reduced but their individual level is higher (due to higher power for each carrier). Each individual overlap has greater CNR impact because the individual beat levels are higher. Furthermore, the maximum carrier output power is reduced because power is spread over fewer peaks.

Modulate Laser Temperature

Another example method to mitigate persistent overlaps between a carrier signal and 4WM byproducts can be to modulate the temperature of the transmitting laser. This can effectively spread the carrier wavelength around so that any worst case overlap between carriers and 4WM byproducts cannot persist for long. The CNR hit cannot affect any individual channel for a significant amount of time. In some cases the wavelength movement is sufficiently slow that the individual channel CNR hit, even though it occurs rarely, can be perceived.

Modulate SBS Suppression Carriers

Modulation of the SBS suppression carriers causes movement in the resulting 4WM byproducts. Consequentially the amplitude of each beat might be less, and the impact of 4WM can be spread across many NTSC bands if the SBS carrier modulation is selected appropriately. There can be technical limitations to this because SBS beats at a frequency less than 2 GHz can cause unwanted distortions in the 0-1 GHz band for the CATV signal. The SBS carrier frequency cannot be set too high or else the SBS peaks spread out too far. The simultaneous alignment of many SBS beats with a group of 4WM products such that all noise power falls within a single 6 MHz CATV channel can become extremely rare. More beats can result in more opportunities for overlap, but for modest SBS carrier modulation might not be significant.

SBS Carriers Randomized in Frequency

In conventional systems, all transmitters use exactly the same "SBS modulation frequency," that is, the modulation frequency used to split the transmitter output (one carrier) into multiple peaks to mitigate the effects of SBS. Consequently many resulting 4WM byproducts fall on exactly the same optical frequency, and many of those frequencies are again spaced by the same modulation frequency. When a group of 4WM byproducts interacts with a transmitter output (carrier), which itself is split into multiple output peaks at the same exact modulation frequency spacing, then the detector output signal of multiple interactions occurs at exactly the same frequency. The noise is concentrated in a narrow frequency band such that a large amount of noise power is concentrated in a single CATV channel.

Randomizing or otherwise varying the SBS modulation frequencies for different transmitters results in the 4WM beat products being no longer regularly-spaced. The resulting detector RF signal has noise terms scattered over many frequencies. Thus, the noise power no longer is concentrated in a single CATV channel. Instead, it is distributed over multiple RF channels that each only suffers a modest CNR impact. The SBS modulation frequencies for different transmitters can be set slightly differently, within a range around 2 GHz. Preferably, the difference is at least 6 MHz such that the resulting noise in the RF domain is distributed over multiple CATV channels (such channels are spaced 6 MHz apart). This can reduce or eliminate the simultaneous alignment of many SBS beats with a group of 4WM products such that all noise power falls within a single 6 MHz CATV channel.

Offset Carrier Wavelengths from ITU Grid Points

In a multi-wavelength system optical frequencies of carriers are typically placed on a grid, such as a 12.5, 25 or 100 GHz spaced ITU grid. As a result, the 4WM beats also occur on the same grid. In many cases, multiple 4WM beats overlap at the same grid point. Offsetting individual transmitter wavelengths slightly from the grid (sub GHz to a few GHz, for example by transmitter temperature variation) has the result that 4WM beats no longer line up at the same frequency as often. Beat frequencies within a group can be scattered. Thus, the 4WM noise impact is scattered over a wider frequency range such that it never impacts any single carrier too much. However, it might be challenging to guarantee predictable small wavelength offsets over the lifetime of the system.

Mix or Couple Low Frequency Tone into the Laser

A low-frequency tone can be mixed into the laser to supplement SBS suppression carriers. The laser is chirped, which broadens the line width of the laser. Thus the spectral width of the noise signal may be increased from for instance 2 MHz to several 100 MHz. As a result the CNR impact due to 4WM will never impact just one CATV channel but instead is smeared out over a large number of channels. The per-channel CNR impact thus becomes acceptably low.

In an externally modulated transmitter, the laser output is provided to an external modulator that imprints the communication signal onto the laser output. Any modulation of the laser power is thus effectively multiplied with the communication signal, not just added. This multiplication results in unwanted distortions of the communication signal. The laser modulation must be kept low. It should be noted that an appropriate counter-modulation of the drive signal gain to the modulator could in principle eliminate the generated distortions. Such a counter modulation would decrease the signal amplitude gain to the modulator as the laser power increases and increase the signal amplitude gain when the laser power decreases. This variation of the gain can typically be done in the stages before the modulator and also before the pre-distortion circuit that is typically used in front of a modulator.

Modulate Bias Current with a Randomized Low Frequency Tone

The bias terminal of a laser can be a more convenient terminal to couple in a low frequency tone. For sufficiently low frequency (e.g. <1 MHz) the laser chirp is very high because the laser chip's temperature is modulated. This type of modulation can be used to broaden the laser line-width to improve the SBS limited output power of the transmitters. However, in prior approaches the modulation frequency that is used was the same for all transmitters, based on a crystal oscillator, and the modulation amplitude is also nominally the same. As a result of this, the CNR impact due to 4WM can still hit a single RF channel instead of being spread out over multiple RF channels.

If all transmitter wavelengths are modulated at a low rate (say 10 KHz), these wavelengths are spread, for instance 200 MHz (thus the apparent line-width is 200 MHz of each transmitter). All of the transmitter spectrums shift in unison. A beat product shifts as follows:

$$fb = f1 + fd + f2 + fd - (f3 + fd) = f1 + f2 - f3 + fd$$

where fd (or fdelta) is the momentary laser frequency deviation due to the low frequency laser modulation. This beat would then interact with a fourth transmitter at optical frequency f4+fd. This results in an RF frequency of:

$$f\_RF = f4 + fd - fb = f4 - f1 - f2 + f3$$

The transmitter wavelength modulation (fdelta) drops out of this equation and only the center frequencies of the participating transmitters remain. That means that f_RF is constant and the noise power may consistently end up in a single RF channel. By randomizing the wavelength modulation rates this mutual cancellation cannot occur. In practical transmitters some CNR degradation of low frequency channels has been observed if the modulation amplitude is too high.

First Transmitter Set 13 dBm SBS, Next Set Higher or Lower SBS Setting

This may result in a modest reduction of overlap between 4WM beat groups and transmitter SBS peaks due to their different shapes.

Other

Low cost transmitters are often linearized to frequencies of 550 MHz and not beyond. Above this frequency, digital signals are transmitted that are less sensitive to distortions. These digital signals will thus cause distortions for lack of linearization, or worse, cause enhanced distortions due to poor behavior of the linearizer circuitry above 550 MHz. A result is distortion enhancement instead of a distortion reduction. Distortions from such digital signals typically result in a reduction of the signal to noise ratio of analog channels below 550 MHz. In order to prevent excessive CNR degradation, signals may be filtered such that the high frequency band containing the digital signals is not provided to the linearization circuitry. Then the linearization circuitry cannot further degrade performance.

Implementation and Alternatives

The techniques and procedures described herein may be implemented via logic distributed in one or more devices. The particular distribution and choice of logic is a design decision that will vary according to implementation.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

Those having skill in the art will appreciate that there are various logic implementations by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Any of the devices (e.g., CMTS, cable modems, EMTAs, etc.) described in this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube), LCD (liquid crystal display), LED (light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what might be claimed, but rather as descriptions of features that might be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing might be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing might be advantageous.

References to "one implementation" or "an implementation" do not necessarily refer to the same implementation, although they can.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number, respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A multi-wavelength cable television (CATV) transmission system comprising transmitters adapted to emit optical carrier wavelengths on a 12.5 GHz+/−20% ITU grid with a minimum spacing of 37.5 GHz+/−20% between optical carriers or with a minimum spacing of 37.5 GHz+/−20% between optical carriers and their optical beat product groups, wherein the minimum spacing precludes beat groups having a mitigated power level higher than a predetermined threshold level from overlapping with an optical carrier.

2. The system of claim 1, comprising sixteen, twenty-four, or thirty-two transmitters simultaneously adapted to emit carrier wavelengths that do not interact to create any four wave mixing products in the upper 75% of the distribution of optical beat walk-off parameters for the wavelength plan that is used.

3. The system of claim 1 wherein the transmitters are externally modulated.

4. The system of claim 3 wherein SBS modulation frequencies of the transmitters are randomized between transmitters.

5. The system of claim 3 wherein the SBS modulation frequencies of a transmitter are modulated.

6. The system of claim 3 wherein a low frequency tone is added to the laser current in the transmitters.

7. The system of claim 6 wherein the low frequency tones are randomized between transmitters.

8. The system of claim 6 wherein the low frequency tones are modulated.

9. The system of claim 6 wherein the optical signal gain of the modulated optical signal is varied with opposite phase to the low frequency tone that is added to the laser.

10. The system of claim 3 wherein a randomized low frequency spectrum is added to the laser current in the transmitters.

11. The system of claim 3 wherein the transmitter wavelengths are offset from the exact ITU frequencies by less than 5 GHz.

12. The system of claim 11 wherein the offset is random.

13. The system of claim 11 wherein the offset is continuously modulated.

14. The system of claim 3 wherein individual transmitters have a different SBS spectrum.

15. The system of claim 3 wherein an input to one or more linearizers of the transmitters is filtered such that high frequencies above 550 MHz are rejected.

16. The system of claim 1 wherein the minimum spacing between transmitter wavelengths is 100 GHz.

17. A multi-wavelength CATV transmission system comprising externally modulated optical transmitters adapted to emit optical carrier wavelengths with spacing between optical carriers and beat groups being multiples of 37.5 GHz+/−20%, wherein a low frequency optical tone is added to the laser current in the transmitters, and wherein the wavelength modulation rates of the low frequency optical tones are randomized between optical transmitters to prevent mutual cancellation of a momentary low frequency induced optical frequency deviation of the transmitters.

18. A multi-wavelength CATV transmission system comprising optical transmitters adapted to emit carrier wavelengths on a 12.5 GHz+/−20% ITU grid comprising sixteen, twenty-four, or thirty-two optical transmitters simultaneously adapted to emit optical carrier wavelengths that do not interact to create any four wave mixing products with cumulative power greater than −70 dB relative to the optical carrier power unless the minimum spacing between optical carriers is 37.5 GHz+/−20% or the minimum spacing between optical carriers and their optical beat product groups is 37.5 GHz+/−20 GHz, wherein the minimum spacing precludes beat groups having a mitigated power level higher than a predetermined threshold level from overlapping with an optical carrier.

19. A multi-wavelength CATV transmission system comprising transmitters adapted to emit optical carrier wavelengths on a 12.5 GHz+/−20% ITU grid, comprising sixteen, twenty-four, or thirty-two transmitters simultaneously adapted to emit optical carrier wavelengths that do not interact to create any four wave mixing products within 37.5 GHz+/−20% of the optical carriers with optical power in the upper 75% of the distribution of four wave mixing products generated by the wavelength plan that is used, wherein the spacing of 37.5 GHz+/−20% precludes beat groups having a mitigated power level higher than a predetermined threshold level from overlapping with an optical carrier.

\* \* \* \* \*